(12) United States Patent
Potter et al.

(10) Patent No.: US 10,655,607 B2
(45) Date of Patent: May 19, 2020

(54) SYSTEMS AND METHODS FOR DETECTING DAMAGE IN WIND TURBINE BEARINGS

(71) Applicant: General Electric Company, Schenectady, NY (US)

(72) Inventors: Joshua Jeffrey Potter, Albany, NY (US); Christopher Robert Drescher, Watervliet, NY (US)

(73) Assignee: General Electric Company, Schenectady, NY (US)

( * ) Notice: Subject to any disclaimer, the term of this patent is extended or adjusted under 35 U.S.C. 154(b) by 44 days.

(21) Appl. No.: 15/611,929

(22) Filed: Jun. 2, 2017

(65) Prior Publication Data

US 2018/0347548 A1    Dec. 6, 2018

(51) Int. Cl.
*F03D 17/00*    (2016.01)
*F03D 80/70*    (2016.01)
*G01M 13/045*    (2019.01)

(52) U.S. Cl.
CPC ............. *F03D 17/00* (2016.05); *F03D 80/70* (2016.05); *G01M 13/045* (2013.01);
(Continued)

(58) Field of Classification Search
None
See application file for complete search history.

(56) References Cited

U.S. PATENT DOCUMENTS 3,677,072 A * 7/1972 Weichbrodt ........... G01H 1/003
                                                        340/683
4,237,454 A * 12/1980 Meyer .................... G01H 1/003
                                                        310/323.21

(Continued)

FOREIGN PATENT DOCUMENTS

| EP | 1 548 419 A1 | 6/2005 |
| EP | 2 581 725 A2 | 4/2013 |
| JP | 2006105956 A * | 4/2006 |

OTHER PUBLICATIONS

English machine translation of Muto et al. (JP 2006-105956 A).*

(Continued)

*Primary Examiner* — David M. Gray
*Assistant Examiner* — Geoffrey T Evans
(74) *Attorney, Agent, or Firm* — Dority & Manning, P.A.

(57) ABSTRACT

A method for detecting damage in a bearing of a wind turbine includes collecting vibration data relating to the bearing. Another step includes storing the vibration data in a memory device. The method also includes identifying a plurality of harmonics in the vibration data that are indicative of bearing damage. Further, the method includes eliminating harmonics within a specified frequency proximity to areas of high energy content representative of normal gearbox operation. Moreover, the method includes determining at least one of increases in energy or a variance of the energy within each of the remaining harmonics and calculating a damage factor of the bearing as a function of a least one of the increases in energy or the variance of the energy within each of the remaining harmonics. Accordingly, the method includes comparing the damage factor to a predetermined damage threshold, wherein a damage factor exceeding the predetermined damage threshold may be indicative of a damaged bearing.

19 Claims, 6 Drawing Sheets

(52) U.S. Cl.
CPC ....... *F05B 2240/50* (2013.01); *F05B 2260/80* (2013.01); *F05B 2260/83* (2013.01)

(56) References Cited

U.S. PATENT DOCUMENTS

| | | | | |
|---|---|---|---|---|
| 6,484,109 | B1* | 11/2002 | Lofall | G01H 1/003 |
| | | | | 702/56 |
| 6,983,207 | B2 | 1/2006 | Gotou et al. | |
| 7,930,111 | B2* | 4/2011 | Luo | G01M 13/045 |
| | | | | 702/34 |
| 8,171,797 | B2 | 5/2012 | Hatch et al. | |
| 8,757,003 | B1* | 6/2014 | Makaremi | G01M 5/0016 |
| | | | | 73/847 |
| 2003/0066352 | A1* | 4/2003 | Leamy | F01D 21/00 |
| | | | | 73/593 |
| 2005/0096873 | A1* | 5/2005 | Klein | G01H 1/006 |
| | | | | 702/184 |
| 2005/0171736 | A1* | 8/2005 | Kang | G01H 1/006 |
| | | | | 702/185 |
| 2007/0277613 | A1* | 12/2007 | Iwatsubo | F16C 19/527 |
| | | | | 73/593 |
| 2008/0033695 | A1* | 2/2008 | Sahara | G01H 1/003 |
| | | | | 702/185 |
| 2008/0223135 | A1* | 9/2008 | Blanchard | G01M 13/045 |
| | | | | 73/579 |
| 2011/0125419 | A1* | 5/2011 | Bechhoefer | F03D 7/047 |
| | | | | 702/34 |
| 2011/0142621 | A1* | 6/2011 | D | F03D 7/0292 |
| | | | | 416/1 |
| 2012/0025526 | A1* | 2/2012 | Luo | H02P 9/04 |
| | | | | 290/44 |
| 2012/0272736 | A1* | 11/2012 | Griffaton | G01M 13/045 |
| | | | | 73/593 |
| 2012/0296582 | A1* | 11/2012 | Hedin | G01H 1/003 |
| | | | | 702/56 |
| 2013/0006540 | A1* | 1/2013 | Sakaguchi | G01H 1/003 |
| | | | | 702/34 |
| 2013/0024164 | A1* | 1/2013 | Paajarvi | G01M 13/045 |
| | | | | 702/194 |
| 2014/0142872 | A1* | 5/2014 | Hedin | G01H 1/003 |
| | | | | 702/56 |
| 2015/0052985 | A1* | 2/2015 | Brenner | G01H 1/003 |
| | | | | 73/112.01 |
| 2015/0322924 | A1* | 11/2015 | Menasanch De Tobaruela | F03D 1/06 |
| | | | | 73/660 |
| 2015/0369698 | A1* | 12/2015 | Sakaguchi | F16C 19/527 |
| | | | | 702/56 |
| 2016/0033580 | A1 | 2/2016 | Qiao et al. | |
| 2016/0187226 | A1* | 6/2016 | Tsutsui | G01M 13/045 |
| | | | | 73/593 |
| 2016/0290892 | A1* | 10/2016 | Lee | G01M 5/0033 |
| 2017/0315516 | A1* | 11/2017 | Kozionov | G01H 1/003 |
| 2019/0056358 | A1* | 2/2019 | Potter | G01N 29/12 |

OTHER PUBLICATIONS

"Measurement of Instantaneous Shaft Speed by Advanced Vibration Signal Processing—Application to Wind Turbine Gearbox"; Zimroz et al.; 2011 Polish Academy of Sciences (Year: 2011).*

Extended European Search Report and Opinion issued in connection with corresponding EP Application No. 18174124.0 dated Dec. 4, 2018.

* cited by examiner

SYSTEMS AND METHODS FOR DETECTING DAMAGE IN WIND TURBINE BEARINGS

FIELD OF THE INVENTION

The present disclosure relates in general to wind turbines, and more particularly to systems and methods for detecting damage in wind turbine bearings, such as low-speed bearings.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a low-speed main shaft coupling the rotor blades to a gearbox, or if a gearbox is not used, directly to the generator. For example, the generator may be coupled to the low-speed main shaft such that rotation of the shaft drives the generator. For instance, the generator may include a high-speed generator shaft rotatably coupled to the main shaft through the gearbox. The generator then converts the mechanical energy from the rotor to electrical energy that may be deployed to a utility grid.

In addition, modern wind turbines include a plurality of high-speed and low-speed bearings to provide rotation of the various components thereof. For example, the low-speed main shaft typically includes one or more main bearings mounted at a forward and rearward end thereof to allow the low-speed main shaft to rotate about an axis. Further, the gearbox may include multiple bearings for providing the desired rotation of the various gears therein. More specifically, the gearbox generally includes low-speed carrier bearings and low-speed planet bearings.

Detection of damaged bearings in a wind turbine is essential in minimizing unplanned downtime of the turbine and increasing turbine availability. One conventional damage detection approach relies on the enveloping spectrum of the main bearing and the planetary stage gearbox sensors. Though the primary fault frequencies for the inner race ball pass (IRBP) and the outer race ball pass (ORBP) in the enveloping spectrum have historically been used as a strong indicator for bearing damage of intermediate-speed and high-speed bearings, such frequencies often do not provide enough clarity for low-speed bearing damage.

Visual detection of bearing fault frequency harmonics has proven successful in locating damaged components; however, this approach relies on the consistent manual inspection of the spectrums. Such inspection is inherently time consuming and can result in missed detection of failed components. In addition, although manual inspection methods have been utilized with success, such methods do not provide a scalable option and result in reduced monitoring efficiency.

For at least the aforementioned reasons, the detection of low-speed bearing damage has proven difficult to automate using traditional detection analytics and/or trending techniques. For low-speed planetary bearings in particular, there is currently no known method which can consistently and accurately detect and trend the energy of bearing damage propagation using traditional fast Fourier transform spectral analysis techniques.

Accordingly, improved systems and methods for detecting damage in low-speed wind turbine bearings would be desired in the art.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for detecting damage in a bearing of a wind turbine. The method includes collecting, via one or more sensors, vibration data relating to the bearing. In one embodiment, for example, the vibration data may include a plurality of frequency signals generated by operation of the wind turbine, including but not limited to gears, shafts, and/or bearings thereof. Another step includes storing the vibration data in a memory device. The method also includes identifying a plurality of harmonics in the vibration data that are indicative of bearing damage. Further, the method includes eliminating harmonics within a specified frequency proximity to areas of high energy content representative of normal gearbox operation. Moreover, the method includes determining at least one of increases in energy or a variance of the energy within each of the remaining harmonics. Thus, the method further includes calculating a damage factor of the bearing as a function of a least one of the increases in energy or the variance of the energy within each of the remaining harmonics. Accordingly, the method includes comparing the damage factor to a predetermined damage threshold. For example, in one embodiment, a damage factor exceeding the predetermined damage threshold may be indicative of a damaged bearing.

In one embodiment, the method may further include determining both increases in the energy and the variance of the energy within each of the remaining harmonics and calculating the damage factor of the bearing for each of the remaining harmonics as a function of both the increases in energy and the variance of the energy within each of the remaining harmonics. More specifically, in certain embodiments, the step of determining the increases in the energy within each of the remaining harmonics may include squaring the sum of the frequency signals within each of the remaining harmonics to obtain a sum of the squares value. In addition, the step of determining the variance of the energy within each of the remaining harmonics may include calculating a mean for each of the remaining harmonics and calculating the variance for each of the remaining harmonics.

In further embodiments, the step of calculating the damage factor of the bearing for each of the remaining harmonics as a function of both the increases in energy and the variance of the energy within each of the remaining harmonics may include multiplying the sum of the squares value by the variance for each of the remaining harmonics.

In several embodiments, the method may further include continuously calculating the damage factor for multiple time periods and trending the damage factor over time.

In yet another embodiment, the method may include determining a bandwidth for each of the plurality of harmonics based on kinematic information of the bearing and identifying the harmonics to be eliminated based on the kinematic information. More specifically, in certain embodiments, the kinematic information may include at least one of a number of teeth of one or more gears of the gearbox, a number of planet gears of a planetary state of the gearbox, a pitch diameter of the bearing, a roller-element diameter of the bearing, a contact angle of the bearing, or combinations thereof. Further, in such embodiments, the normal gearbox vibration may include gear-related vibration, shaft vibration, and/or any other bearing vibration.

In further embodiments, the method may further include requiring the plurality of harmonics to pass one or more rules before being used to calculate the damage factor. For example, in certain embodiments, the rule(s) may include any one or more of the following: setting a predetermined minimum frequency value and a predetermined maximum frequency value and requiring the frequency signals of each of the harmonics to be between the predetermined minimum frequency value and the predetermined maximum frequency value; or setting a predetermined maximum number of harmonics and ensuring that the number of harmonics does not exceed the maximum number.

In additional embodiments, the bearing may include a main bearing, a carrier bearing, and/or a planet bearing. In certain embodiments, the frequency signals are generated from a passage of bearing rolling elements over damage on at least one of an inner race or an outer race of the bearing.

In another aspect, the present disclosure is directed to a system for detecting damage in a low-speed bearing of a wind turbine. The system includes one or more sensors for collecting vibration data relating to the bearing. For example, in one embodiment, the vibration data may include a plurality of frequency signals generated by operation of the wind turbine, including but not limited to gears, shafts, and/or bearings thereof. The system may also include a controller communicatively coupled to the one or more sensors. The controller includes at memory store and at least one processor. The memory store is configured to store the vibration data therein. The processor(s) is configured to perform one or more operations, including but not limited to identifying a plurality of harmonics in the vibration data that are indicative of bearing damage, eliminating harmonics within a specified frequency proximity to areas of high energy content representative of normal gearbox operation, determining at least one of increases in energy or a variance of the energy within each of the remaining harmonics, calculating a damage factor of the bearing as a function of a least one of the increases in energy or the variance of the energy within each of the remaining harmonics, and comparing the damage factor to a predetermined damage threshold, wherein a damage factor exceeding the predetermined damage threshold is indicative of a damaged bearing. It should also be understood that the system may include any of the additional features and/or may be configured to implement any of the steps described herein.

In yet another aspect, the present disclosure is directed to a method for detecting damage in a low-speed bearing of a wind turbine. The method includes obtaining, via one or more sensors, a plurality of vibration signals relating to operation of the wind turbine. For example, in one embodiment, the frequency domain of the vibration signals can be generated utilizing the fast Fourier transform. Further, the method includes identifying a plurality of harmonics in the vibration signals that are indicative of bearing damage in the wind turbine. The method also includes eliminating harmonics within a specified frequency proximity to areas of high energy content representative of normal gearbox operation. Moreover, the method includes analyzing energy of the vibration signals within each of the remaining harmonics. In addition, the method includes calculating a damage factor of the bearing as a function of the analysis. Thus, the method also includes determining whether damage is present in the bearing based on the damage factor. It should also be understood that the method may further include any of the additional features and/or steps described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for detecting bearing damage in wind turbine gearboxes that utilize vibration spectrum data to trend the energy of patterns associated with bearing damage. More specifically, algorithms of the present disclosure generate a scalar value, or damage factor, which can be trended over time to indicate damage propagation in the inner or outer race of a bearing. More specifically, for wind turbine gearboxes, the present disclosure detects damage of the inner and outer race of low-speed bearings including main bearings, carrier bearings, and/or planet bearings.

For conventional detection systems, failures of the planetary stage bearings are especially difficult to detect due to the signal attenuation caused from the increased vibration transfer path from bearing to sensor, increased planetary stage noise, and inherent variability in the location of the damaged component relative to the load zone and sensor. As such, the present disclosure utilizes the harmonics of the inner race ball pass and the outer race ball pass fault frequencies for each low-speed bearing to detect and trend increases in energy and increases of variance within this energy at a defined range around each harmonic. As such, the systems and methods of the present disclosure are designed to lower the output of healthy bearings while amplifying the output of damaged bearings to allow for automated threshold detection with minimal false positive events. Thus, the present disclosure increases availability by reducing unplanned downtime, prolongs turbine main bearing life, reduces potential secondary damage, and increases monitoring efficiency for accurate low-speed bearing damage detection.

Figure 1:
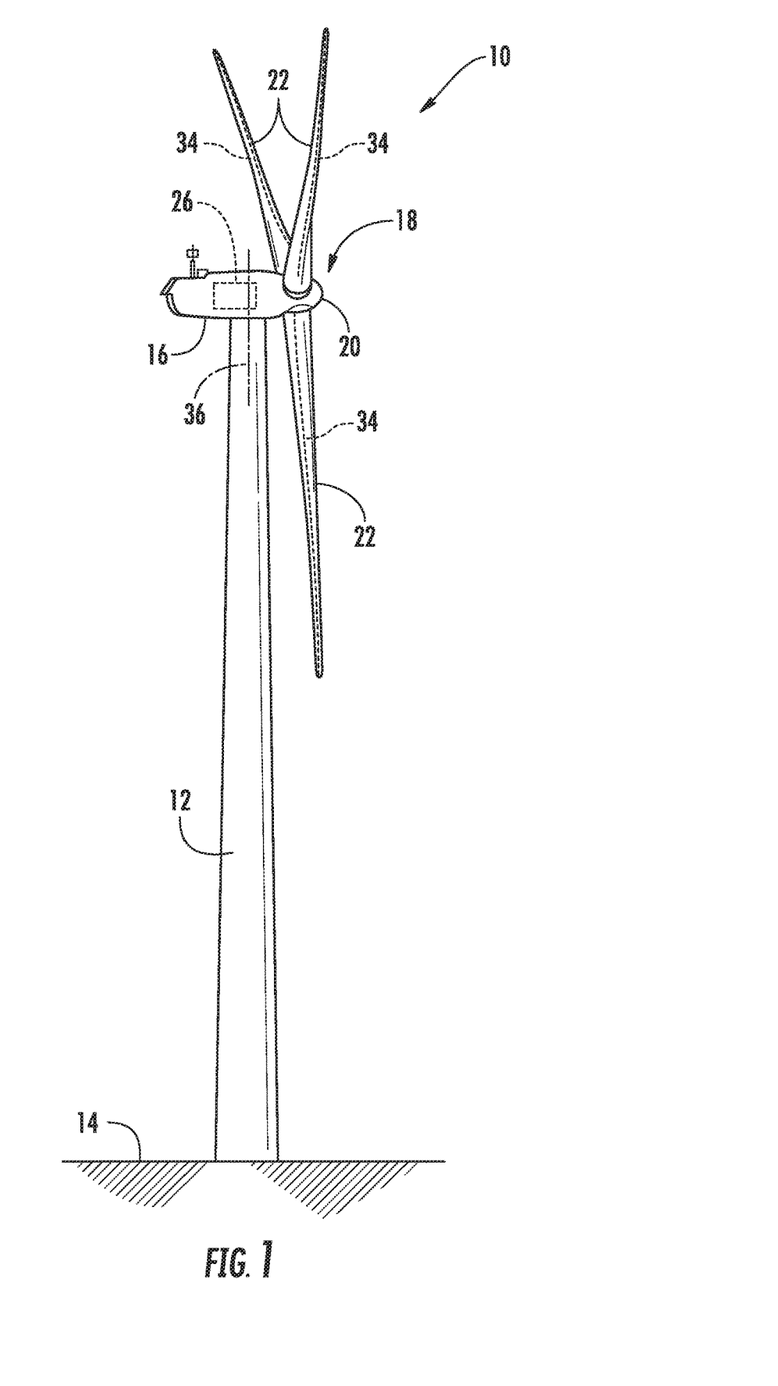
FIG. 1 illustrates a perspective view of a wind turbine according to one embodiment of the present disclosure.

Referring now to the drawings, FIG. 1 illustrates a perspective view of one embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to drivetrain system 28 (FIG. 2) positioned within the nacelle 16 to permit electrical energy to be produced.

Figure 2:
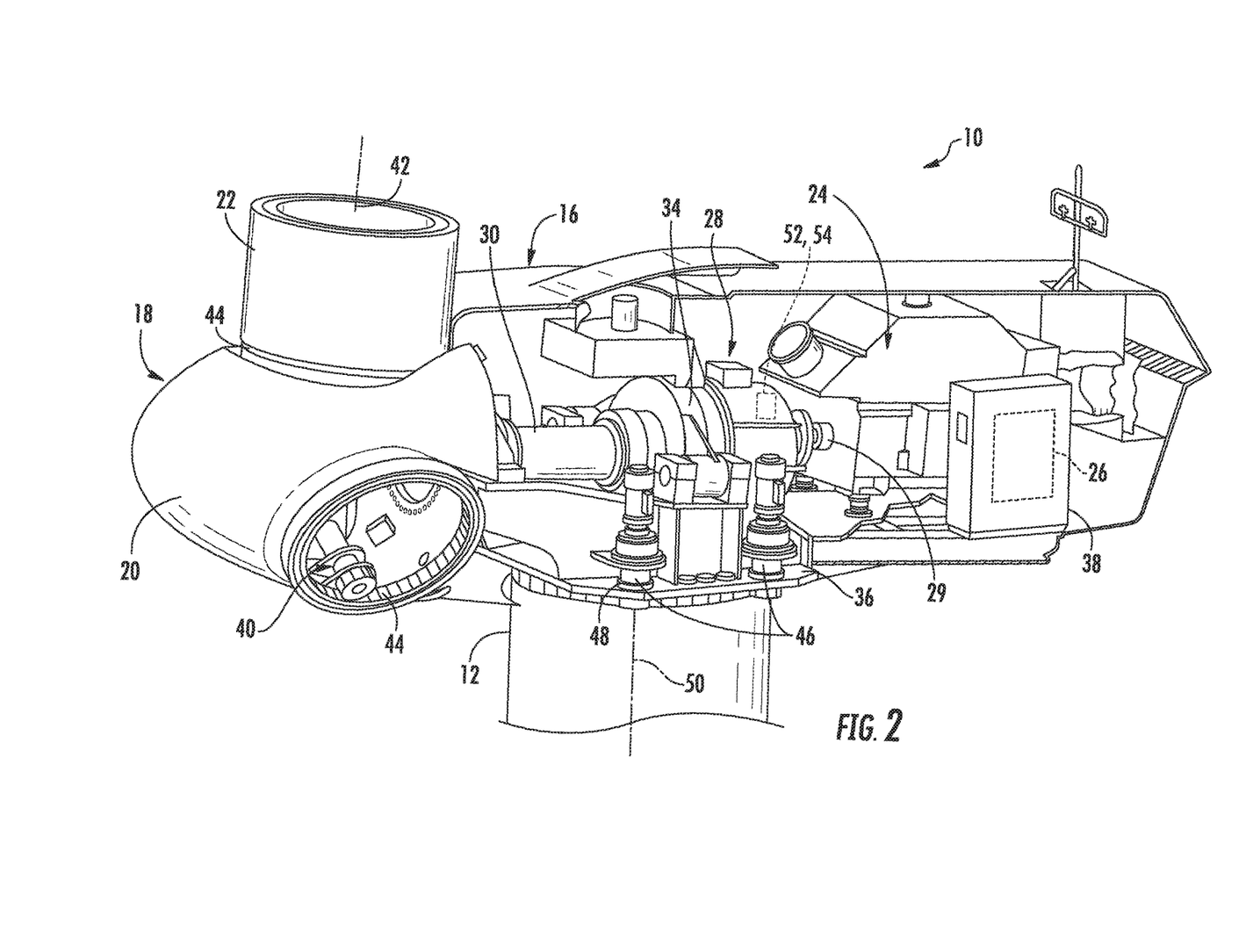
FIG. 2 illustrates a perspective, internal view of a nacelle of a wind turbine according to one embodiment of the present disclosure.

Referring now to FIG. 2, a simplified, internal view of one embodiment of the nacelle 16 of the wind turbine 10 housing the drivetrain system 28 therein is illustrated. As shown, the drivetrain system 28 includes, at least, a generator 24 disposed within the nacelle 16. In general, the generator 24 may be coupled to the rotor 18 of the wind turbine 10 for generating electrical power from the rotational energy generated by the rotor 18. For example, the rotor 18 may include a main shaft 30 coupled to the hub 20 for rotation therewith. The generator 24 may then be coupled to the main shaft 30 such that rotation of the main shaft 30 drives the generator 24. For instance, in the illustrated embodiment, the generator 24 includes a generator shaft 29 rotatably coupled to the main shaft 30 through a gearbox 34. However, in other embodiments, it should be appreciated that the generator shaft 29 may be rotatably coupled directly to the main shaft 30. Alternatively, the generator 24 may be directly rotatably coupled to the main shaft 30. It should be appreciated that the main shaft 30 may generally be supported within the nacelle 16 by a support frame or bedplate 36 positioned atop the wind turbine tower 12.

As shown in FIGS. 1 and 2, the wind turbine 10 may also include a turbine control system or a turbine controller 26 within the nacelle 16. For example, as shown in FIG. 2, the turbine controller 26 is disposed within a control cabinet 38 mounted to a portion of the nacelle 16. However, it should be appreciated that the turbine controller 26 may be disposed at any location on or in the wind turbine 10, at any location on the support surface 14 or generally at any other location. The turbine controller 26 may generally be configured to control the various operating modes (e.g., start-up or shut-down sequences) and/or components of the wind turbine 10.

Each rotor blade 22 may also include a pitch adjustment mechanism 40 configured to rotate each rotor blade 22 about its pitch axis 42 via pitch bearing 44. Similarly, the wind turbine 10 may include one or more yaw drive mechanisms 46 communicatively coupled to the controller 26, with each yaw drive mechanism(s) 46 being configured to change the angle of the nacelle 16 relative to the wind (e.g., by engaging a yaw bearing 48 of the wind turbine 10 to rotate the nacelle 16 about yaw axis 50).

In addition, as shown in FIG. 2, the wind turbine 10 may further include one or more sensors 52, 54 for monitoring various vibrations thereof. For example, as shown, the illustrated sensors 52, 54 may be gearbox sensors configured to monitor vibrations of the drivetrain system 28 so as to detect damage of one or more of the bearings described herein. As such, the sensors 52, 54 may be any suitable sensor capable of detecting such vibration signals. In addition, it should be understood that the wind turbine 10 may include any suitable number of sensors for detecting such vibrations.

Figure 3:
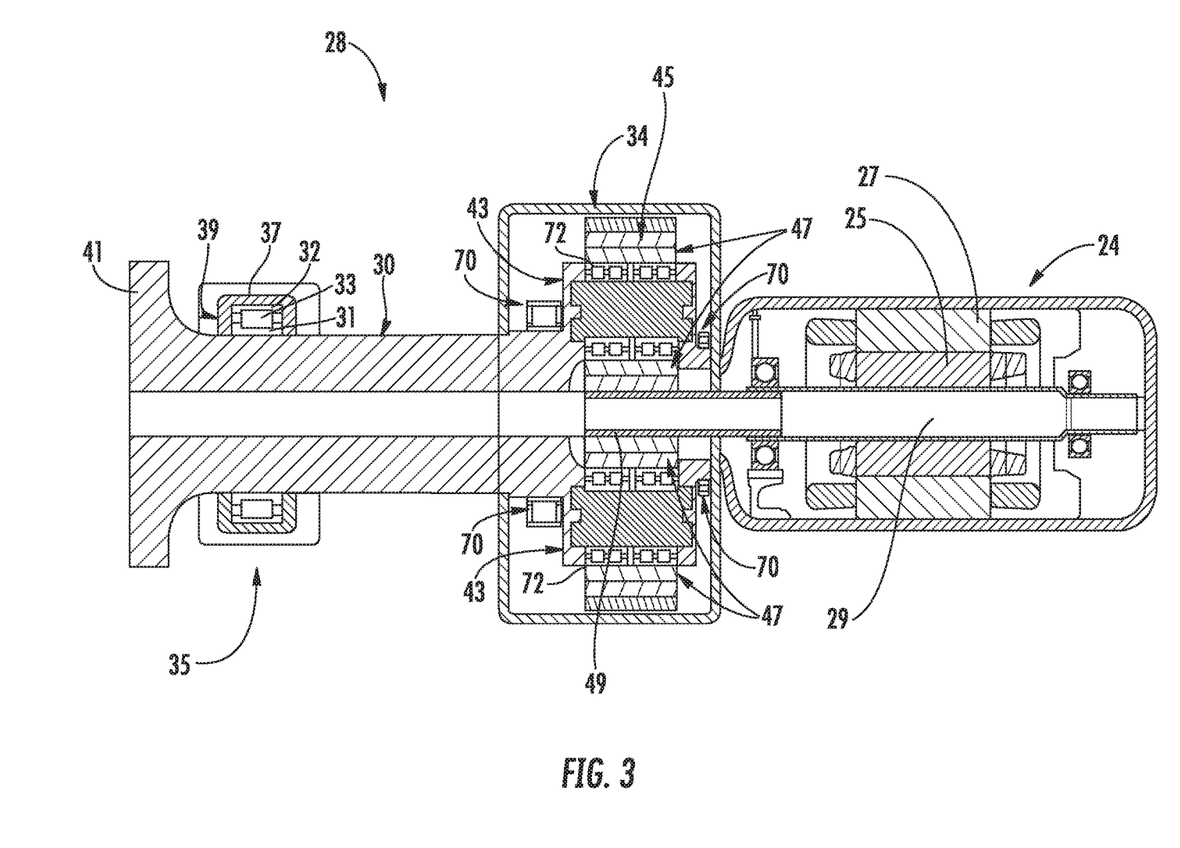
FIG. 3 illustrates a cross-sectional view of one embodiment of a drivetrain system of a wind turbine according to the present disclosure.

Referring now to FIG. 3, a detailed, cross-sectional view of the drivetrain system 28 of the wind turbine 10 is illustrated to further depict the various components thereof. As mentioned, the drivetrain system 28 includes, at least, the generator 24 and the gearbox 34. Further, as shown, the generator 24 includes a generator rotor 25 and a generator stator 27. As is generally known in the art, the generator rotor 25 is a generally movable component of the generator 24, while the stator 27 is a generally stationary component of the generator 24. Further, in certain embodiments, the generator 24 may be a doubly-fed induction generator (DFIG). However, it should be understood that the generator 24 according to the present disclosure is not limited to DFIG generators, and may include any generator suitable for powering the wind turbine 10 of the present disclosure. In general, the rotor blades 16 rotate the generator rotor 25 of the generator 24. As such, the generator rotor 25 may be operably connected to the hub 18. Accordingly, operation of the rotor blades 16 rotates the rotor hub 18, which rotates the generator rotor 25 and thus operates the generator 24.

Further, as shown, the low-speed main shaft 30 is configured to provide an input rotational speed to a gearbox 34. For example, the hub 18 may be mounted to the main shaft 30. As shown, the main shaft 30 may include a flange 41 configured to engage a mating flange (not shown) on the hub 18 to mount the hub 18 to the main shaft 30. Thus, during operation of the wind turbine 10, the rotational speed of the rotor blades 16 may be directly transmitted through the hub 18 to the main shaft 30 as an input rotational speed.

The main shaft 30 may extend through and be supported by at least one support housing 35 or a plurality of support housings 35. For example, a forward housing 37 and, in some embodiments, an aft housing (not shown), may be provided to support the main shaft 30. In addition, the housings 35 may include one or more bearings 39 configured to interact with the main shaft 30. For example, as shown, the forward housing 37 may include a locating bearing 39 (also referred to herein as a main shaft bearing 39) configured therein, while the aft housing may include a floating bearing (not shown) configured therein. It should be understood that the present disclosure is not limited to locating bearings and floating bearings positioned in housings as described above and the figures are provided for illustrative purposes only. Further, as shown, the main shaft bearing(s) 39 may include an inner race 31, an outer race 32, and a plurality roller elements 33 configured therebetween.

Still referring to FIG. 3, the gearbox 34 as described herein may be a planetary gearbox 34. As such, the gearbox 34 may be configured to convert the input rotational speed from the main shaft 30 to an output rotational speed. In one embodiment, the output rotational speed may be faster than the input rotational speed. Alternatively, however, the output rotational speed may be slower than the input rotational speed. In one embodiment, the gearbox 34 may be a single stage gearbox. Thus, the input rotational speed may be converted to the output rotational speed through a single stage of various mating gears, as discussed below. Alternatively, however, the gearbox 34 may be a multiple stage gearbox, and the input rotational speed may be converted to the output rotational speed through multiple stages of various mating gears.

More specifically, the illustrated embodiment of the planetary gearbox 34 includes a stationary ring gear 45 and a plurality of rotatable gears. As such, the stationary ring gear 45 supports the various rotatable gears configured therein. In addition, the stationary ring gear 45 includes various axes for the rotatable gears to rotate about. In certain embodiments, the planetary gearbox 34 may also include a stationary ring gear 45, one or more rotatable planet gears 47, and a rotatable sun gear 49. For example, in one embodiment, the planetary gearbox 34 may include four planet gears 47. However, it should be understood that more or less than four planet gears 47 are within the scope and spirit of the present disclosure. In addition, each of the rotatable gears in the planetary gearbox 34 includes a plurality of gear teeth (not shown). As such, the teeth may mesh together such that the various gears 45, 47, 49 engage each other.

In several embodiments, the carrier 43 may drive the planetary gearbox 34. Thus, the carrier 43 and the main shaft 30 may be coupled such that the input rotational speed of the main shaft 30 is provided to the carrier 43. For example, a gearbox disk may connect the carrier 43 and main shaft 30, or the carrier 43 and main shaft 30 may be otherwise suitably connected. Alternatively, however, the ring gear 45 or the sun gear 49 may drive the planetary gearbox 34.

Referring still to FIG. 3 and as mentioned, the drivetrain system 28 of the present disclosure may further include an output or generator shaft 29. More specifically, as shown, the generator shaft 29 may be coupled with the gearbox 34, and configured to rotate at the output rotational speed. In particular embodiments, for example, the generator shaft 29 may be coupled to the sun gear 49. Thus, the sun gear 49 may engage the planet gears 47 and may further extend from the planetary gearbox 34 towards the generator 24. In other embodiments, the generator shaft 29 may be coupled to the sun gear 49 or other output gear of the planetary gearbox 34 or other suitable gearbox such that the generator shaft 29 may rotate at the output rotational speed.

In addition, various bearings 39, 70, 72 may support the various rotatable components of the drivetrain system 28 to facilitate relatively efficient rotation of such rotatable components. For example, as shown, a plurality of carrier bearings 70 may support the planetary carrier 43 and a plurality of planet bearings 72 may support the planet gears 47 and/or additional bearings which support the sun gear or sun gear shaft (not shown). Such bearings 70, 72 may be roller bearings, and include various roller elements arranged in generally annular arrays, or may be journal bearings or any other suitable bearings. In addition, the bearings 39, 70, 72 as described herein may also be referred to as low-speed bearings.

In addition, as shown in FIG. 3, the turbine controller 26 may be coupled with the vibration sensors 52, 54. Further, the vibration sensors 52, 54 may also be coupled to a separate controller that may or may not be located in the control cabinet 38. As such, the sensors 52, 54 may provide related information to the turbine controller 26 and/or the separate controller. It should also be appreciated that, as used herein, the term "monitor" and variations thereof indicates that the various sensors of the wind turbine 10 may be configured to provide a direct measurement of the parameters being monitored and/or an indirect measurement of such parameters. Thus, the sensors described herein may, for example, be used to generate signals relating to the parameter being monitored, which can then be utilized by the controller 26 to determine the condition.

Figure 4:
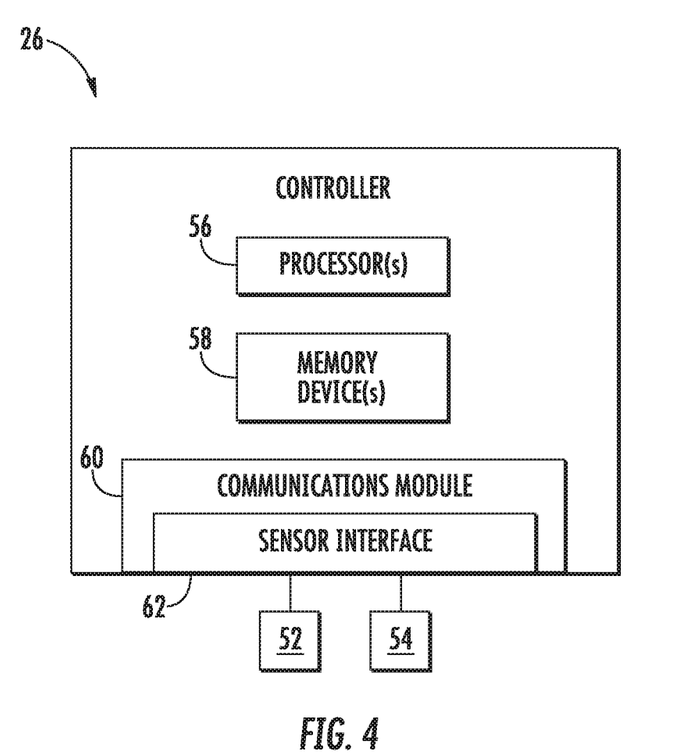
FIG. 4 illustrates a block diagram of one embodiment of suitable components that may be included in a wind turbine controller according to the present disclosure.

Referring now to FIG. 4, there is illustrated a block diagram of one embodiment of suitable components that may be included within the controller 26 (or a separate controller) according to the present disclosure. As shown, the controller 26 may include one or more processor(s) 56 and associated memory device(s) 58 configured to perform a variety of computer-implemented functions (e.g., performing the methods, steps, calculations and the like and storing relevant data as disclosed herein). Additionally, the controller 26 may also include a communications module 60 to facilitate communications between the controller 26 and the various components of the wind turbine 10. Further, the communications module 60 may include a sensor interface 62 (e.g., one or more analog-to-digital converters) to permit signals transmitted from one or more sensors 52, 54 to be converted into signals that can be understood and processed by the processors 56. It should be appreciated that the sensors 52, 54 may be communicatively coupled to the communications module 64 using any suitable means. For example, as shown in FIG. 4, the sensors 52, 54 are coupled to the sensor interface 62 via a wired connection. However, in other embodiments, the sensors 52, 54 may be coupled to the sensor interface 62 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 58 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 58 may generally be configured to store suitable computer-readable instructions that, when implemented by the processor(s) 56, configure the controller 26 to perform various functions including, but not limited to, transmitting suitable control signals to implement corrective action(s) in response to a distance signal exceeding a predetermined threshold as described herein, as well as various other suitable computer-implemented functions.

Figure 5:
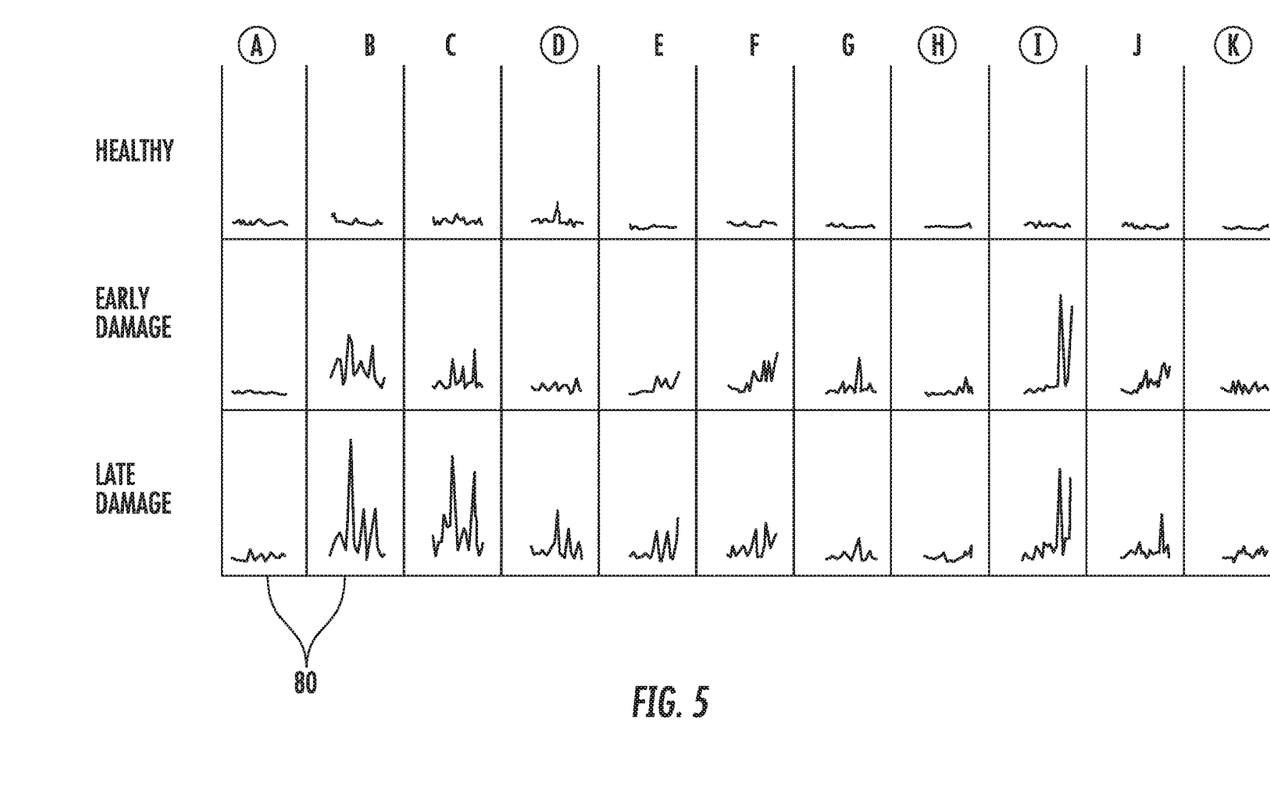
FIG. 5 illustrates graph of vibration data collected from a healthy, an early damaged, and a late damaged low-speed bearing of a wind turbine, respectively, according to the present disclosure, particularly illustrating the vibration data organized into a plurality of harmonics.

The turbine controller 26 may further be configured to implement an algorithm to detect damage of one or more of the low-speed drivetrain bearings of the wind turbine 10. For example, in one embodiment, the controller 26 is configured to implement a method for detecting damage in one or more of the bearings 39, 70, 72 of the wind turbine 10. More specifically, as shown in FIG. 5, the turbine controller 26 is configured to collect vibration data relating to the bearings 39, 70, 72 via the sensors 52, 54. In certain embodiments, as shown, the vibration data may include a plurality of frequency signals generated by operation of the wind turbine 10, including but not limited to gears (such as gears 47), shafts (such as main shaft 30), and/or bearings 39, 70, 72 (e.g. such as fault frequency signals generated from the passage of bearing rolling elements over damage on the inner or outer races of one or more of the bearings 39, 70, 72 described herein). Thus, as shown, the system and methods of the present disclosure are designed to lower the output of healthy bearings while amplifying the output of damaged bearings to allow for automated threshold detection with minimal false positive events.

In addition, the controller 26 may be configured to store the vibration data in the memory device(s) 58. Once the frequency signals are collected and stored, the controller 26 is configured to identify one or more harmonics 80 in the vibration data that are representative of bearing damage. For example, as shown particularly in FIG. 5, the controller 26 identifies a plurality of individual harmonics 80 or time periods that can be analyzed to assess bearing damage. In the illustrated embodiment, for example, a total of eleven harmonics 80 are illustrated. However, it should be understood that more than eleven or less than eleven harmonics 80 may be utilized in additional embodiments.

Further, the controller 26 is configured to eliminate harmonics 80 that fail to pass one or more rules or meet one or more requirements (e.g. as indicated by the circled harmonics 80 of FIG. 5). More specifically, as shown, columns A, D, H, I, and K of the harmonics 80 have been eliminated for failing to meet one or more rules required by the algorithm. As such, only those harmonics 80 that are representative of abnormal bearing operation are used in the calculation of the damage factor, which is discussed in more detail below.

The rule(s) or requirement(s) as described herein are designed to provide a greater difference between data collected from damaged bearings versus healthy bearings. For example, one of the rules may include setting a predetermined minimum frequency value and a predetermined maximum frequency value and requiring the frequency signals of each of the harmonics 80 to be between the predetermined minimum frequency value and the predetermined maximum frequency value. More specifically, as shown in FIG. 5, harmonics 80 that fail to exceed a certain minimum frequency are eliminated. Still another requirement may include setting a predetermined maximum number of harmonics and ensuring that the number of harmonics does not exceed the maximum number.

In a multi-stage gearbox with a planetary stage, such as the wind turbine gearbox 34, the vibration spectrum contains energy from many sources of the gearbox 34 during normal operation. As such, a further requirement may include eliminating harmonics 80 within a specified frequency proximity to areas of high energy content representative of normal gearbox operation, such as gear-related vibration, shaft vibration, and/or any other types of bearing vibration. Thus, to extract the desired energy of a bearing fault, the controller 26 is configured to utilize the gearbox kinematic information to avoid energy content from the gears and shafts of the wind turbine 10 (also referred to herein as normal gearbox operation). Such vibration sources are typically inherent in all gearboxes of this design and are removed from the design factor calculation to allow for separation from healthy and damaged bearings.

The kinematic information as described herein may include any of the following: the number of gear teeth of one or more gears of the gearbox 34, the number of planet gears of a planetary state of the gearbox 34, a pitch diameter of the bearing 39, 70, 72, a roller-element or ball diameter of the bearing 39, 70, 72, a contact angle of the bearing 39, 70, 72, or combinations thereof. As such, the kinematic information provides the IRBP and ORBP fault frequencies to the controller 26, which are used to locate the vibration patterns that indicate bearing damage.

Due to the variation in fault frequency harmonic energy in the spectrum, a range or bandwidth of energy is defined around each harmonic 80. For example, in several embodiments, the controller 26 may determine a bandwidth for each of the harmonics 80 based on kinematic information of the bearing 39, 70, 72 and identify the harmonics 80 to be eliminated based on the kinematic information. The controller 26 may then calculate a vector around the defined ranges as dictated by the bandwidth for each fault frequency harmonic for any harmonic that does not break the defined rules. For fault frequency harmonics that break any of the rules, the value is left as null. For certain embodiments, the calculation loop continues for each harmonic 80 until the maximum number of harmonics is reached or the maximum frequency is exceeded.

With the harmonics within a specified frequency proximity to areas of high energy content representative of normal gearbox operation being eliminated, the controller 26 can then further analyze the remaining harmonics 80 to assess bearing damage. For example, still referring to FIG. 5, the controller 26 is configured to evaluate increases in energy for a given harmonic 80. In addition, the controller 26 is configured to determine a variance of the energy within each of the remaining harmonics 80. As used herein, the energy of each harmonic may be synonymous with the acceleration of the frequency signals well as any other derivative thereof, such as velocity, displacement, or similar. More specifically, as shown in FIG. 7, the first or top row of harmonics 80 represent a healthy bearing, the second row of harmonics 80 represent an early damaged bearing, and the third row of harmonics 80 represents a late damaged bearing. Referring particularly to columns B, C, E, F, G, and J of the harmonics 80, the increases in energy are clearly illustrated to depict differences between damaged and healthy bearings. Further, as shown particularly in the second and third columns, a high variance of energy is illustrated.

More specifically, the controller 26 can determine the increases in the energy within each of the remaining harmonics 80 by summing the square of each individual data point of the frequency signals within a given harmonic 80 to obtain a sum of the squares value. In addition, the controller 26 can determine the variance of the energy within each of the remaining harmonics 80 by calculating a mean for each of the remaining harmonics 80 and then, utilizing the mean, calculating the variance for each of the remaining harmonics 80.

Thus, the controller 26 is configured to calculate a damage factor for one or more of the bearings 39, 70, 72 as a function of the increases in energy and/or the variance of the energy within each of the remaining harmonics 80. For example, in one embodiment, the controller 26 may calculate the damage factor of the bearing 39, 70, 72 by multiplying the sum of the squares value by the variance for each of the remaining harmonics 80. In addition, the damage factor may be scaled by any suitable factor to produce an output value within an acceptable range, i.e. to further amplify the difference between healthy and damaged bearings.

In further embodiments, the controller 26 may also be configured to continuously calculate and store the damage factor for multiple time periods. As such, the turbine controller 26 is further configured to trend the damage factor over time. Further, in such embodiments, to determine the final design factor where multiple factors are calculated, the controller 26 is configured to sum the values of the vector, divide by the total number of harmonics 80 for which the energy values were individually calculated (i.e. the harmonics that did not break any of the rules), and multiply by a scale factor to achieve a desirable final output. Such trending further separates the damage factor values between healthy and damaged bearings to allow for automated threshold detection.

Once the damage factor is calculated, the controller 26 is configured to compare the damage factor to a predetermined damage threshold that is indicative of damage in one of the bearings 39, 70, 72. As such, in certain embodiments, if the damage factor exceeds the predetermined damage threshold, then the controller 26 is configured to indicate that the bearing is damaged. For example, in certain embodiments, the controller 26 may generate an alarm and/or send an alarm signal to an operator.

Figure 6:
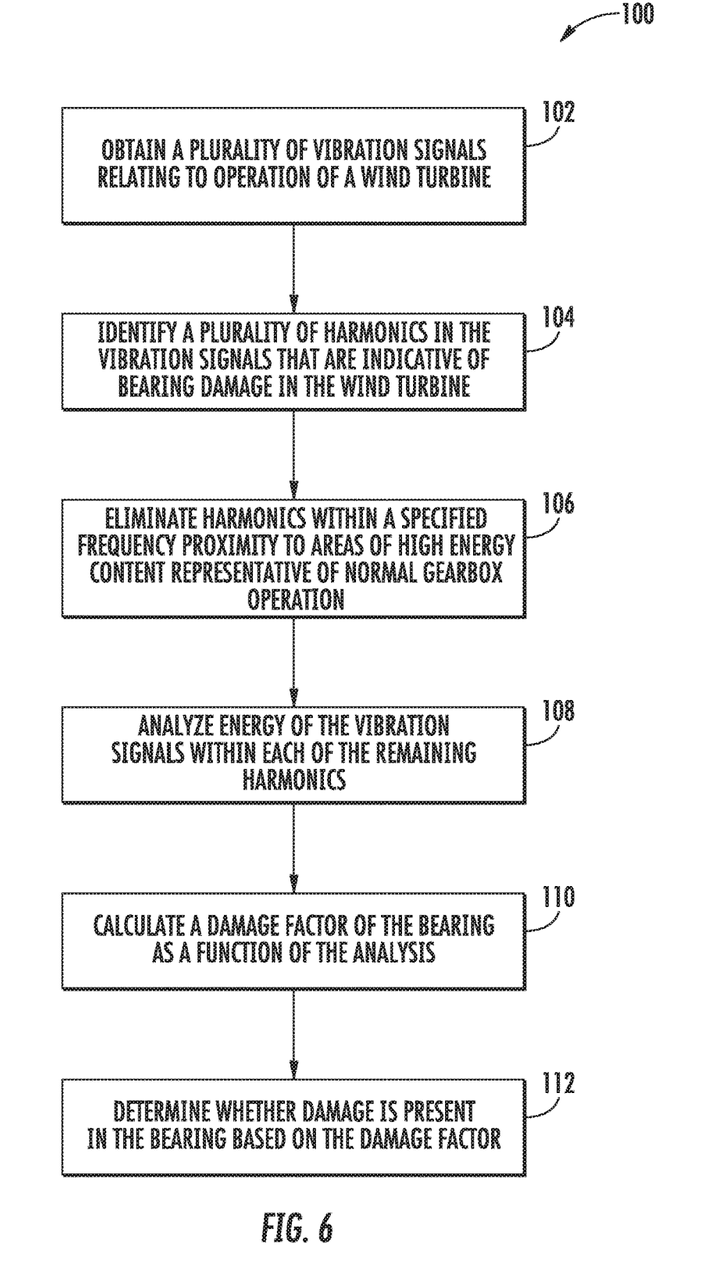
FIG. 6 illustrates a flow diagram of one embodiment of a method for detecting damage in a low-speed bearing of a wind turbine according to the present disclosure.

Referring now to FIG. 6, a flow diagram of one embodiment of a method 100 for detecting damage in a low-speed bearing of a wind turbine is illustrated. As shown at 102, the method 100 includes obtaining a plurality of vibration signals relating to operation of a wind turbine via one or more sensors. As shown at 104, the method 100 includes identifying a plurality of harmonics in the vibration signals that are indicative of bearing damage in the wind turbine 10. As shown at 106, the method 100 includes eliminating harmonics within a specified frequency proximity to areas of high energy content representative of normal gearbox operation. As shown at 108, the method 100 includes analyzing energy of the frequency signals within each of the remaining harmonics. As shown at 110, the method 100 includes calculating a damage factor of the bearing as a function of the analysis. As shown at 112, the method 100 includes determining whether damage is present in the bearing based on the damage factor.

It should be understood that the systems and methods described herein may be suitable for any gearbox and/or bearing combination having a variety of vibration patterns (i.e. harmonic series). As such, the algorithm of the present disclosure is capable of predicting failures on any suitable gearbox/bearing where the kinematic information is known. More specifically, utilizing the full kinematic information as described herein to detect bearing damage in a traditional fast Fourier transform spectrum (rather than an enveloping spectrum) allows the controller 26 to both locate the pattern indicative of bearing damage and avoid the normal operation patterns in the frequency signals.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for automatically detecting damage in a low-speed bearing of a wind turbine, the method comprising:

collecting, via one or more vibration sensors, inner and outer race ball pass frequency data relating to the low-speed bearing;

storing the inner and outer race ball pass frequency data in a memory device communicatively coupled to the one or more vibration sensors;

identifying, via a processor communicatively coupled to the memory device, a plurality of harmonics in the inner and outer race ball pass frequency data that are indicative of bearing damage in the wind turbine;

eliminating, via the processor, harmonics within a specified frequency proximity to areas of high energy content representative of normal gearbox operation of the wind turbine within the inner and outer race ball pass frequency data;

determining, via the processor, increases in energy and a variance of the energy within each of the remaining harmonics of the inner and outer race ball pass frequency data;

calculating, via the processor, a damage factor of the bearing for each of the remaining harmonics as a function of both the increases in energy and the variance of the energy within each of the remaining harmonics of the inner and outer race ball pass frequency data;

comparing, via the processor, the damage factor to a predetermined damage threshold, wherein a damage factor exceeding the predetermined damage threshold is indicative of a damaged low-speed bearing; and in response to the damage factor exceeding the predetermined damage threshold, automatically generating, via the processor, an alarm signal to an operator.

2. The method of claim 1, wherein determining the increases in the energy within each of the remaining harmonics further comprises:

summing the squares of the frequency signals within each of the remaining harmonics to obtain a sum of the squares value.

3. The method of claim 2, wherein determining the variance of the energy within each of the remaining harmonics further comprises:

calculating a mean for each of the remaining harmonics; and, calculating the variance for each of the remaining harmonics.

4. The method of claim 3, wherein calculating the damage factor of the low-speed bearing for each of the remaining harmonics as a function of both the increases in energy and the variance of the energy within each of the remaining harmonics further comprises:

multiplying the sum of the squares value by the variance for each of the remaining harmonics.

5. The method of claim 1, further comprising calculating the damage factor for multiple time periods and trending the damage factor over time.

6. The method of claim 1, wherein eliminating harmonics within the specified frequency proximity to areas of high energy content representative of normal gearbox operation further comprises:

determining a bandwidth for each of the plurality of harmonics based on kinematic information of the low-speed bearing; and, identifying the harmonics to be eliminated based on the kinematic information, wherein the kinematic information comprises at least one of a number of teeth of one or more gears of the gearbox, a number of planet gears of a planetary state of the gearbox, a pitch diameter of the low-speed bearing, a roller-element diameter of the low-speed bearing, a contact angle of the low-speed bearing, or combinations thereof.

7. The method of claim 6, wherein the normal gearbox operation comprises at least one of gear-related vibration or shaft-related vibration.

8. The method of claim 7, further comprising requiring the plurality of harmonics to pass one or more rules before being used to calculate the damage factor, the one or more rules comprising at least one of:
setting a predetermined minimum frequency value and a predetermined maximum frequency value and requiring the frequency signals of each of the harmonics to be between the predetermined minimum frequency value and the predetermined maximum frequency value; or
setting a predetermined maximum number of harmonics and ensuring that the number of harmonics does not exceed the maximum number.

9. The method of claim 1, wherein the bearing comprises at least one of a main bearing, a carrier bearing, or a planet bearing.

10. The method of claim 1, wherein the frequency data comprises frequency signals generated from a passage of bearing rolling elements over damage on at least one of an inner race or an outer race of the bearing.

11. A system for automatically detecting damage in a low-speed bearing of a wind turbine, the system comprising:
one or more vibration sensors for collecting inner and outer race ball pass frequency data relating to the bearing, the frequency vibration data comprising a plurality of frequency signals generated by operation of the wind turbine;
a controller communicatively coupled to the one or more vibration sensors, the controller having at least one memory store and at least one processor, the at least one memory store configured to store the frequency data therein, the at least one processor configured to perform a plurality of operations, the plurality of operations comprising:
identifying a plurality of harmonics in the frequency vibration data indicative of bearing damage;
eliminating harmonics within a specified frequency proximity to areas of high energy content representative of normal gearbox operation;
determining increases in energy and a variance of the energy within each of the remaining harmonics;
calculating a damage factor of the bearing for each of the remaining harmonics as a function of both the increases in energy and the variance of the energy within each of the remaining harmonics;
comparing the damage factor to a predetermined damage threshold, wherein a damage factor exceeding the predetermined damage threshold is indicative of a damaged bearing; and
in response to the damage factor exceeding the predetermined damage threshold, automatically generating an alarm signal to an operator.

12. The system of claim 11, wherein determining the increases in the energy within each of the remaining harmonics further comprises summing the squares of the frequency signals within each of the remaining harmonics to obtain a sum of the squares value, and wherein determining the variance of the energy within each of the remaining harmonics further comprises calculating a mean for each of the remaining harmonics, and calculating the variance for each of the remaining harmonics.

13. The system of claim 12, wherein calculating the damage factor of the bearing further comprises multiplying the sum of the squares value by the variance for each of the remaining harmonics.

14. The system of claim 11, wherein the one or more operations further comprise calculating the damage factor for multiple time periods and trending the damage factor over time.

15. The system of claim 11, wherein the one or more operations further comprise determining a bandwidth for each of the plurality of harmonics based on kinematic information of the bearing, and identifying the harmonics to be eliminated based on the kinematic information, wherein the kinematic information comprises at least one of a number of teeth of one or more gears of the gearbox, a number of planet gears of a planetary state of the gearbox, a pitch diameter of the bearing, a roller-element diameter of the bearing, a contact angle of the bearing, or combinations thereof.

16. The system of claim 15, wherein the one or more operations further comprise requiring the plurality of harmonics to pass one or more rules before being used to calculate the damage factor, the one or more rules comprising at least one of:
setting a predetermined minimum frequency value and a predetermined maximum frequency value and requiring the frequency signals of each of the harmonics to be between the predetermined minimum frequency value and the predetermined maximum frequency value; or
setting a predetermined maximum number of harmonics and ensuring that the number of harmonics does not exceed the maximum number.

17. The system of claim 11, wherein the bearing comprises at least one of a main bearing, a carrier bearing, or a planet bearing, and wherein the frequency signals are generated from a passage of bearing rolling elements over damage on at least one of an inner race or an outer race of the bearing.

18. A method for detecting damage in a low-speed bearing of a wind turbine, the method comprising:
obtaining, via one or more sensors, a plurality of inner and outer race ball pass frequency data signals relating to the bearing;
identifying a plurality of harmonics in the frequency signals indicative of bearing damage;
eliminating harmonics within a specified frequency proximity to areas of high energy content representative of normal gearbox operation;
analyzing increases in energy and a variance of the energy of the frequency signals within each of the remaining harmonics;
calculating a damage factor of the bearing as a function of the analysis;
determining whether damage is present in the bearing based on the damage factor; and
in response to damage being present in the bearing, automatically generating an alarm signal to an operator.

19. A method for detecting damage in a low-speed bearing of a wind turbine, the method comprising:
obtaining, via one or more sensors, a plurality of vibration signals relating to the bearing;
identifying a plurality of harmonics in the vibration signals indicative of bearing damage;
eliminating harmonics within a specified frequency proximity to areas of high energy content representative of normal gearbox operation;

analyzing increases in energy and a variance of the energy of the frequency signals within each of the remaining harmonics;
calculating a damage factor of the bearing as a function of the analysis;
determining whether damage is present in the bearing based on the damage; and
in response to damage being present in the bearing, automatically generating an alarm signal to an operator.

* * * * *